(12) United States Patent
Pflueger et al.

(10) Patent No.: US 11,335,971 B2
(45) Date of Patent: May 17, 2022

(54) BATTERY MODULE WITH A PLURALITY OF BATTERY CELLS

(71) Applicant: Robert Bosch GmbH, Stuttgart (DE)

(72) Inventors: Claus Gerald Pflueger, Markgröningen (DE); Markus Schmitt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 16/444,109

(22) Filed: Jun. 18, 2019

(65) Prior Publication Data

US 2019/0386273 A1 Dec. 19, 2019

(30) Foreign Application Priority Data

Jun. 19, 2018 (DE) ...................... 10 2018 209 887.5

(51) Int. Cl.
| | |
|---|---|
| *H01M 50/30* | (2021.01) |
| *H01M 10/613* | (2014.01) |
| *H01M 10/647* | (2014.01) |
| *H01M 10/6568* | (2014.01) |
| *H01M 50/209* | (2021.01) |

(52) U.S. Cl.
CPC ....... *H01M 50/394* (2021.01); *H01M 10/613* (2015.04); *H01M 10/647* (2015.04); *H01M 10/6568* (2015.04); *H01M 50/209* (2021.01)

(58) Field of Classification Search
CPC ............. H01M 2/12–1264; H01M 10/64–647; H01M 2/10–1061; H01M 50/30–394; H01M 10/65–6568; H01M 50/20–209; H01M 10/60–6568
See application file for complete search history.

(56) References Cited

U.S. PATENT DOCUMENTS

| | | | |
|---|---|---|---|
| 2011/0027632 A1 | 2/2011 | Higashino et al. | |
| 2012/0315515 A1* | 12/2012 | Guen .................. | H01M 2/0473 429/56 |
| 2015/0188203 A1* | 7/2015 | Enomoto ............ | H01M 10/613 429/83 |
| 2018/0034021 A1* | 2/2018 | Yamamoto ............ | H01M 50/20 |

FOREIGN PATENT DOCUMENTS

| | | |
|---|---|---|
| DE | 102016116326 A1 | 3/2017 |
| EP | 2980882 A1 | 2/2016 |
| JP | 2018018754 A | 2/2018 |

* cited by examiner

*Primary Examiner* — Cynthia H Kelly
*Assistant Examiner* — Niara Trant
(74) *Attorney, Agent, or Firm* — Michael Best & Friedrich LLP

(57) ABSTRACT

A battery module comprising a battery cell having a battery cell housing, and a battery module housing, wherein a coolant fluid intake is configured between the battery module housing and the battery cell housing, such that a direct and thermal contact is provided between the coolant fluid and the battery cell housing, wherein the battery cell housing further comprises a gas venting opening, which is configured to discharge gas from the interior of the battery cell housing directly to a surrounding environment, wherein the gas venting opening of the battery cell housing is isolated from the coolant fluid intake in a fluid-tight manner, wherein one lateral surface of the battery cell housing of the at least one battery cell, on which the gas venting opening is arranged, other than in the region of the gas venting opening, is essentially entirely enclosed by the coolant fluid intake.

7 Claims, 3 Drawing Sheets

BATTERY MODULE WITH A PLURALITY OF BATTERY CELLS

BACKGROUND OF THE INVENTION

The invention is based upon a battery module having a plurality of battery cells.

From the prior art, it is known that battery modules can comprise a plurality of individual battery cells, which can be mutually connected in series and/or in parallel in an electrically conductive manner, such that the individual battery cells are interconnected to constitute a battery module.

Moreover, such battery modules are interconnected to constitute batteries or battery systems.

On the grounds of the variety of installation spaces available in vehicles, variable module sizes are preferred, in order to permit the optimum exploitation of the available vehicle installation space.

On the grounds of chemical conversion processes, specifically associated with an output of energy, for example during travel, or with a take-up of energy, for example during charging, lithium-ion battery cells or lithium-polymer battery cells undergo heat-up.

The more powerful a battery module, the greater the resulting heat-up, and thus the associated necessity for an efficient and controllable temperature control system, by means of which the battery cells of the battery module can be cooled or heated, wherein battery cells primarily require cooling.

Specifically in the case of lithium-ion battery cells, the optimum service temperature lies within the range of 5° C. to 35° C. wherein, in excess of temperatures of the order of 40° C., the service life of such batteries can be significantly reduced.

Consequently, an adequate temperature control system is required for the battery module, in order to achieve comparatively long service lives in battery cells.

Accordingly, in all operating states, batteries should be constantly maintained in a thermally non-critical state, below approximately 40° C.

Moreover, temperature gradients between the individual battery cells should also be avoided, in order to prevent different rates of ageing in the battery cells. It is thus endeavored to achieve temperature gradients between battery cells of less than 5 K, in order to prevent different states of ageing within the battery module.

From the prior art, it is known that the temperature control system of a battery module is primarily configured as a fluid temperature control system, wherein a mixture of water and glycol flows through coolant ducts, for example in a cooling plate which is arranged below the battery module.

It is furthermore to be avoided that, in the event of a fault, any inordinate heat-up of a battery cell can be transferred to further battery cells, by an arrangement which is also generally described as propagation protection.

SUMMARY OF THE INVENTION

A battery module with a plurality of battery cells according to the invention provides an advantage, in that the coolant fluid can be directly circulated around the battery cells of the battery module over the largest possible surface area such that, specifically up to the region of a gas venting opening, virtually the entire battery cell can be wetted by the coolant fluid and, specifically, a region around the gas venting opening can be wetted by the coolant fluid, as a result of which the reliable temperature control of the battery module is possible, even in the event of a fault.

A battery module is provided for this purpose.

The battery module comprises at least one battery cell.

The at least one battery cell is specifically configured as a lithium-ion battery cell.

The at least one battery cell comprises a battery cell housing, in which the electrochemical components of the at least one battery cell are accommodated.

The battery module further comprises a battery module housing, in which the at least one battery cell is accommodated.

A coolant fluid receptacle is configured between the battery module housing and the battery cell housing of the at least one battery cell, which is configured to accommodate a throughflow of coolant fluid.

The coolant fluid receptacle is moreover configured such that a direct and thermal contact can be constituted between the coolant fluid, which can flow through the coolant fluid receptacle, and the battery cell housing of the at least one battery cell.

The battery cell housing further comprises a gas venting opening, which is configured to discharge gas from the interior of the battery cell housing directly to a surrounding environment of the battery module.

Specifically, the gas venting opening is configured to discharge gas from the interior of the battery cell housing in the event of a fault such as, for example, an excessively high temperature.

The gas venting opening of the battery cell housing is thus isolated from the coolant fluid receptacle in a fluid-tight manner.

Moreover, one lateral surface of the battery cell housing of the at least one battery cell, on which the gas venting opening is arranged, other than in the region of the gas venting opening, is essentially entirely enclosed by the coolant fluid receptacle.

By means of the measures described in the dependent claims, advantageous further developments and improvements of the device disclosed in the independent claim are possible.

By the configuration of a battery module according to the invention, it is specifically possible, in comparison with known battery modules from the prior art, to achieve a comparatively large wetting surface, specifically in a region around the gas venting opening, and moreover to prevent, in the event of the venting of gas from the battery cell, any additional pressure increase in the coolant fluid.

By the separation, according to the invention, of the gas venting opening and the coolant fluid receptacle, by means of which coolant fluid is supplied for the wetting of the battery cell housing, it can thus be additionally prevented, for example, that the battery cell housing is exploded by any increase in pressure.

Moreover, it is thus also reliably ensured that, further to the venting of gas, no coolant fluid can escape, as the coolant fluid receptacle and the gas venting opening are separated from one another in a fluid-tight manner.

It is appropriate if the battery module further comprises a sealing element, which is arranged between the battery cell housing and the battery module housing.

The sealing element is configured, for example, as a molded seal. It is thus possible, in a reliable manner, to constitute a fluid-tight barrier between the gas venting opening of the battery cell housing and the coolant fluid receptacle.

Moreover, it is also appropriate if the sealing element is arranged to peripherally enclose the gas venting opening.

By peripherally enclosing, in this context, it is understood that the sealing element is arranged thereupon over the entire periphery of said sealing element, wherein the periphery can assume, for example, a circular, rounded or rectangular shape.

It is thus possible, in a reliable manner, to entirely isolate the gas venting opening of the battery cell housing from the coolant fluid receptacle, over the entire periphery of the gas venting opening, in a fluid-tight manner.

According to one advantageous aspect of the invention, the battery module housing comprises a plurality of spacers, which are configured to maintain a clearance between the battery module housing and the battery cell housing, thus constituting the coolant fluid receptacle, such that the battery module housing and the battery cell housing can be spaced from one another in a reliable manner, thereby constituting a coolant fluid receptacle which also shows an adequate mechanical stability.

The plurality of spacers can preferably be configured as an integral element of the battery module housing.

It is preferred if the sealing element is arranged in a spacer which is arranged directly adjacently to the gas venting opening, or is accommodated in a spacer which is arranged directly adjacently to the gas venting opening.

A reliable fluid-tight barrier between the gas venting opening and the coolant fluid receptacle can thus be constituted.

It is specifically preferred if the battery cell is configured as a prismatic battery cell.

Prismatic battery cells have a total of six lateral surfaces, wherein opposing lateral surfaces are arranged in parallel with one another and, additionally, are customarily configured to identical dimensions.

Moreover, adjacently-arranged lateral surfaces are arranged at right angles to one another.

Preferably, the four smallest lateral surfaces of the at least one prismatic battery cell, other than in the region of the gas venting opening, are essentially entirely enclosed by the coolant fluid receptacle.

It is thus possible that the at least one battery cell, on its two largest lateral surfaces, can further be arranged adjacently to one further battery cell respectively.

It is thus possible that, between the now at least two battery cells, a space which is configured to accommodate a throughflow of coolant fluid is constituted.

Naturally, it is possible for all six lateral surfaces of the at least one battery cell, other than in the region of the gas venting opening, to be essentially entirely enclosed by the coolant fluid receptacle.

Specifically, the coolant fluid is configured as a coolant liquid.

Appropriate coolant fluids are known from the prior art and feature, for example, a high thermal capacity, in order to permit the evacuation of sufficient thermal energy.

The invention specifically also relates to a form of embodiment of the battery module, wherein the coolant liquid is accommodated in the coolant fluid receptacle.

BRIEF DESCRIPTION OF THE DRAWINGS

Exemplary embodiments of the invention are represented in the drawings, and are described in greater detail in the following description.

In the drawings.

DETAILED DESCRIPTION

Figure 1:
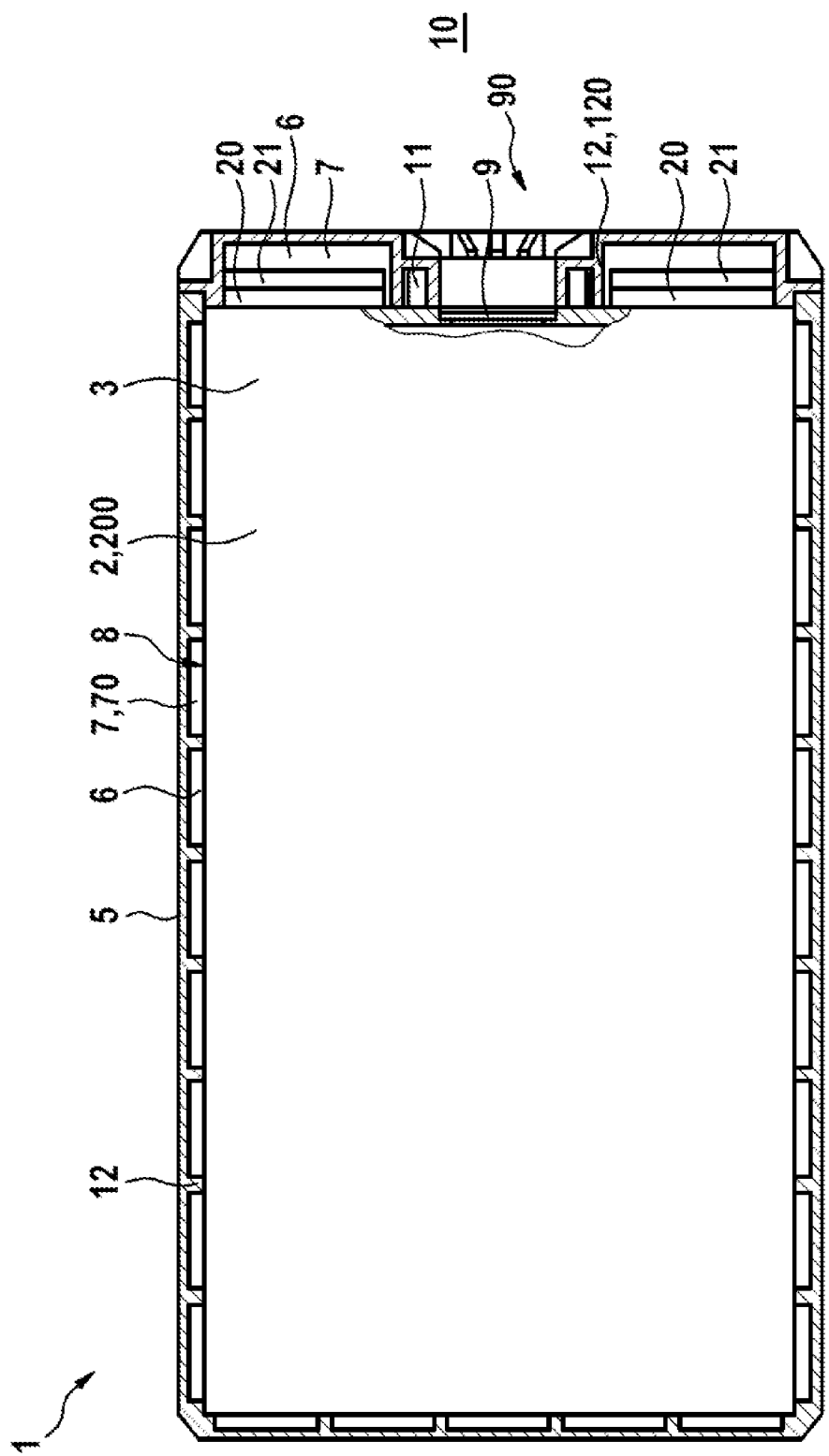
FIG. 1 shows a schematic sectional representation of one form of embodiment of a battery module according to the invention.

FIG. 1 shows a schematic lateral sectional representation of one form of embodiment of a battery module 1 according to the invention.

The battery module 1 incorporates at least one battery cell 2, which comprises a battery cell housing 3.

In the battery cell housing 3 in FIG. 1, electrochemical components 4 of the at least one battery cell 2, which are not visible, are accommodated.

The electrochemical components 4 of the at least one battery cell 2 can comprise, for example, a cathode element, an anode element and a separator element.

The battery module 1 further comprises a battery module housing 5. The at least one battery cell 2 is accommodated in the battery module housing 5.

From the sectional view in FIG. 1, it can be seen that a coolant fluid receptacle 6 is configured between the battery module housing 5 and the battery cell housing 3 of the at least one battery cell 2.

The coolant fluid receptacle 6 can thus accommodate a coolant fluid 7 and, in the exemplary embodiment according to FIG. 1, a coolant fluid 7 is also accommodated in the coolant fluid receptacle 6.

The coolant fluid receptacle 6 is configured such that a direct and thermal contact can be constituted between the coolant fluid 7 and the battery cell housing 3, or is further constituted in the exemplary embodiment according to FIG. 1.

Thermal contact of this type is constituted, for example, at the point identified by reference number 8.

The battery cell housing 3 further comprises a gas venting opening 9. The gas venting opening 9 is configured to discharge gas from the interior of the battery cell housing 3 directly to a surrounding environment 10 of the battery module 1.

At this point, it should be observed that the at least one battery cell 2 can also comprise voltage taps 20, which are employed for the interconnection of individual battery cells 2 electrically in series and/or electrically in parallel. Such interconnection of individual battery cells 2, electrically in series and/or electrically in parallel, can be constituted by means of cell connectors 21.

At least the voltage taps 20 are also to be understood as an element of the battery cell housing 3.

The gas venting opening 9 is arranged on one lateral surface 90 of the battery cell housing 3.

The gas venting opening 9 of the battery cell housing 3 is isolated from the coolant fluid receptacle 6 in a fluid-tight manner.

In other words, the gas venting opening 9 of the battery cell housing 3 is not covered by the coolant fluid receptacle 6, and thus cannot enter into contact with the coolant fluid 7 either.

The lateral surface 90 of the battery cell housing 3 of the at least one battery cell 2, other than in the region of the gas venting opening, is essentially entirely enclosed by the coolant fluid receptacle 6.

According to the exemplary embodiment represented in FIG. 1, the battery module 1 further comprises a sealing element 11, wherein the sealing element 11 is arranged between the battery cell housing 3 and the battery module housing 5 such that a reliable fluid-tight barrier can be constituted between the gas venting opening 9 and the coolant fluid receptacle 6.

The sealing element 11, for example, can be arranged to peripherally surround the gas venting opening 9, such that a reliable fluid-tight barrier can be constituted between the gas venting opening 9 and the coolant fluid receptacle 6 over the entire periphery of the gas venting opening 9.

It can moreover be seen from FIG. 1 that the battery module housing 5 comprises a plurality of spacers 12. The spacers 12 can be configured as an integral element of the battery module housing 5, as a result of which, for example, simple production of the battery module 1 is possible.

The spacers 12 are configured to maintain a mutual clearance between the battery module housing 5 and the battery cell housing 3, such that the coolant fluid receptacle 6 can be constituted between the battery module housing 5 and the battery cell housing 3.

Additionally, from FIG. 1, it can further be seen that the sealing element 11 is also accommodated in a spacer 12, wherein said spacer 12 is a spacer 120 which is arranged directly adjacently to the gas venting opening 9.

The battery cell 2, in the exemplary embodiment according to FIG. 1, is specifically configured as a prismatic battery cell 200.

At this point, it should again be mentioned that a prismatic battery cell 200 has a total of six lateral surfaces. Lateral surfaces configured in a mutually opposing arrangement are customarily of equal size, and are also arranged in parallel with one another. Moreover, lateral surfaces arranged directly adjacently to one another are arranged at right angles to one another.

In the exemplary embodiment according to FIG. 1, the coolant fluid receptacle 6 is at least arranged on the four smallest lateral surfaces of the battery cell housing 3.

Figure 2:
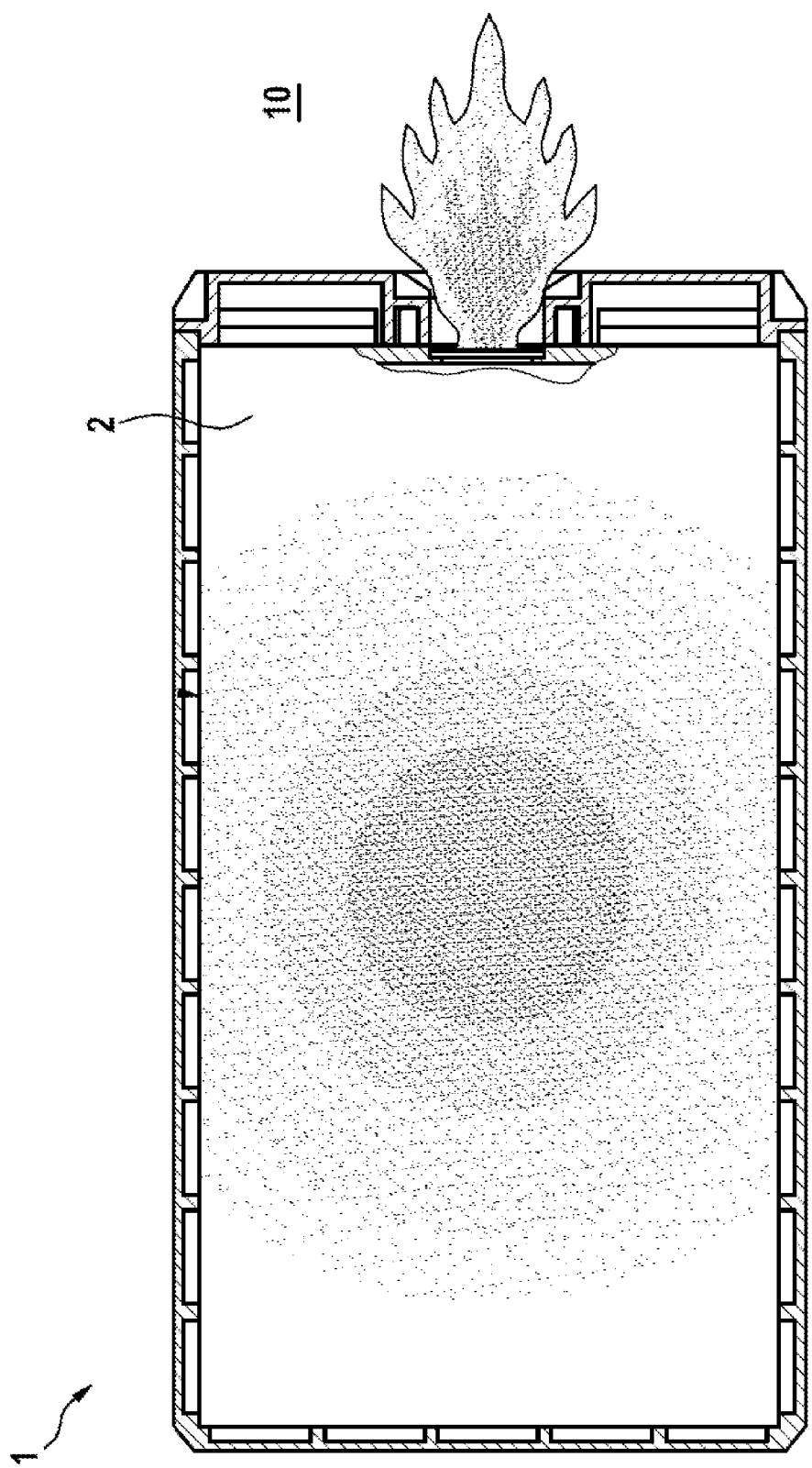
FIG. 2 shows a schematic sectional representation of gas venting in the battery module according to the invention represented in FIG. 1.

FIG. 2 shows a schematic sectional representation of gas venting in the battery module 1 according to the invention represented in FIG. 1.

From FIG. 2, it can be seen that the at least one battery cell 2 has exceeded a critical safety temperature, as a result of which the pressure in the interior of the battery cell 2 has risen such that the gas venting opening 9 is opened, thus permitting the escape of gas from the interior of the battery cell housing 3 of the at least one battery cell 2 into the surrounding environment 10 of the battery module 1.

As no direct contact is constituted between the coolant fluid receptacle 6 and the gas venting opening 9, a coolant fluid 7 accommodated in the coolant fluid receptacle 6 likewise undergoes no rise in pressure associated with the escaping stream of gas during gas venting.

Moreover, the large wetting surface constituted between the battery cell housing 3 and a coolant fluid 7 accommodated in the coolant fluid receptacle 6 contributes to the absence of any significant rise in pressure in the coolant fluid 7 associated with the heat-up of the battery cell 2.

Figure 3:
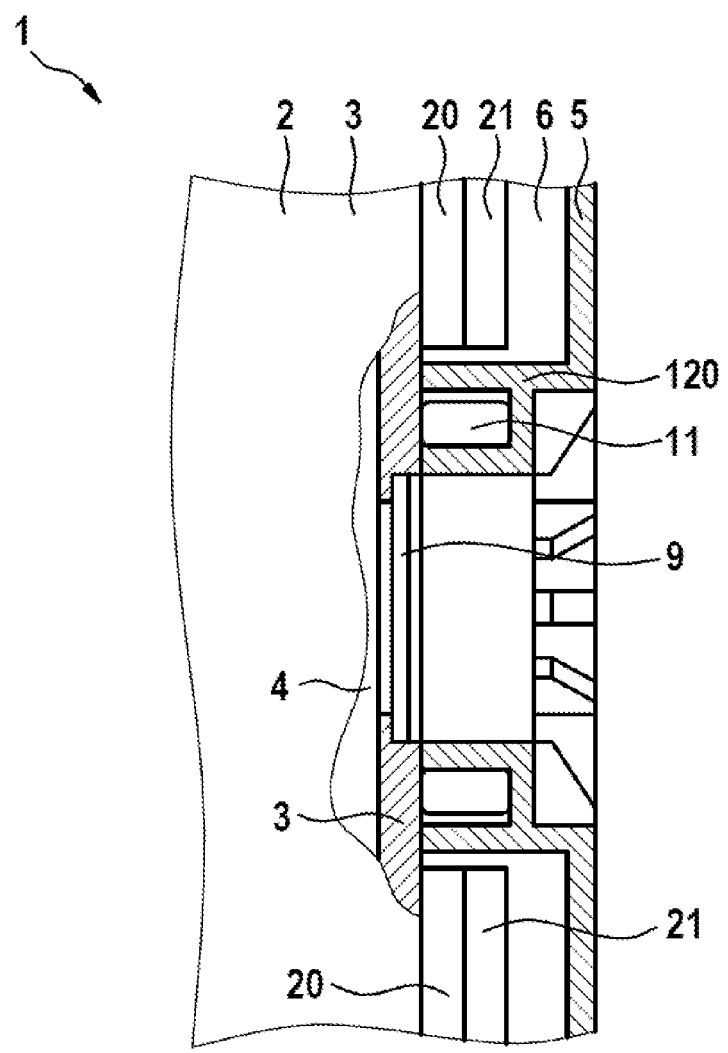
FIG. 3 shows a schematic detailed sectional representation of the form of embodiment of the battery module according to the invention, according to FIG. 1.

FIG. 3 shows a schematic detailed sectional representation of the form of embodiment of the battery module according to the invention, according to FIG. 1.

FIG. 3 specifically shows an enlarged representation of one region around the gas venting opening 9.

Firstly, the at least one battery cell 2 and the battery cell housing 3 can be seen.

The electrochemical components 4 of the at least one battery cell 2 are represented.

The at least one battery 2 comprises voltage taps 20 which, in an electrically conductive manner, can be connected in series and/or in parallel with further battery cells 2 by means of cell connectors 21.

Moreover, the battery module housing 5 can also be seen, which comprises the spacer 120 arranged directly adjacently to the gas venting opening 9.

The sealing element 11 is accommodated in the spacer 120.

It can further be seen that the coolant fluid receptacle 6 is configured between the battery module housing 5 and the battery cell housing 3.

The invention claimed is:

1. A battery module comprising
at least one battery cell (2) having a battery cell housing (3), in which electrochemical components (4) of the at least one battery cell (2) are accommodated, and a battery module housing (5), in which the at least one battery cell (2) is accommodated,
wherein a coolant fluid receptacle (6) is formed between the battery module housing (5) and the battery cell housing (3) of the at least one battery cell (2), wherein the coolant fluid receptacle (6) is configured to accommodate a throughflow of coolant fluid (7), so as to provide a direct and thermal contact (8) between the coolant fluid (7) and the battery cell housing (3),
wherein the battery cell housing (3) further comprises a gas venting opening (9), which is configured to discharge gas from the interior of the battery cell housing (3) directly to a surrounding environment (10) and which is arranged on one lateral surface (90) of the battery cell housing (3),
wherein the gas venting opening (9) of the battery cell housing (3) is isolated from the coolant fluid receptacle (6) in a fluid-tight manner,
wherein a portion of the coolant fluid receptacle (6) is formed between the battery module housing (5) and the one lateral surface (90) and surrounds the gas venting opening (9),
wherein the battery module (1) further comprises a sealing element (11) arranged between the battery cell housing (3) and the battery module housing (5), and
wherein the sealing element (11) peripherally encloses the gas venting opening (9) and is arranged between the coolant fluid receptacle (6) and the gas venting opening (9).

2. The battery module according to claim 1, characterized in that
the battery module housing (5) comprises a main body and a plurality of spacers (12) in the form of projections which project from the main body toward the battery cell housing (3), wherein the plurality of spacers (12) define a clearance between the battery module housing (5) and the battery cell housing (3) and between adjacent pairs of the spaces (12), thus providing the coolant fluid receptacle (6).

3. The battery module according to claim 2, characterized in that
one of the spacers (120) is arranged directly adjacent to the gas venting opening and includes a recess, wherein the sealing element (11) is arranged in the recess of the one of the spacers (120), and wherein the spacer (120) is arranged between the coolant fluid receptacle (6) and the gas venting opening (9).

4. The battery module according to claim 1, characterized in that the battery cell (2) is configured as a prismatic battery cell (200), wherein four smallest lateral surfaces thereof, other than in the region of the gas venting opening (9), are essentially entirely enclosed by the coolant fluid receptacle (6).

5. The battery module according to claim 1, characterized in that the coolant fluid (7) is a coolant liquid (70), wherein the coolant liquid (7) is accommodated in the coolant fluid receptacle (6).

6. The battery module according to claim 3, characterized in that the battery cell (2) is configured as a prismatic battery cell (200), wherein four smallest lateral surfaces thereof, other than in the region of the gas venting opening (9), are essentially entirely enclosed by the coolant fluid receptacle (6).

7. The battery module according to claim 6, characterized in that the coolant fluid (7) is a coolant liquid (70), wherein the coolant liquid (7) is accommodated in the coolant fluid receptacle (6).

* * * * *